US008153211B2

(12) United States Patent
van der Zwan et al.

(10) Patent No.: US 8,153,211 B2
(45) Date of Patent: Apr. 10, 2012

(54) INK-JET-PRINTABLE DECORATIVE PAPER

(75) Inventors: Rijk van der Zwan, Bad Iburg (DE); Stefan Strunk, Wallenhorst (DE)

(73) Assignee: Technocell Dekor GmbH & Co. KG, Osnabruck (DE)

( * ) Notice: Subject to any disclaimer, the term of this patent is extended or adjusted under 35 U.S.C. 154(b) by 245 days.

(21) Appl. No.: 12/666,467

(22) PCT Filed: Jun. 20, 2008

(86) PCT No.: PCT/EP2008/057869

§ 371 (c)(1), (2), (4) Date: Jan. 29, 2010

(87) PCT Pub. No.: WO2009/000768

PCT Pub. Date: Dec. 31, 2008

(65) Prior Publication Data

US 2010/0189931 A1 Jul. 29, 2010

(30) Foreign Application Priority Data

Jun. 25, 2007 (DE) ........................ 10 2007 029 540

(51) Int. Cl.
*B32B 3/00* (2006.01)
*B32B 5/16* (2006.01)
*B32B 7/00* (2006.01)

(52) U.S. Cl. ............... 428/32.21; 428/32.28; 428/32.34; 428/195.1; 428/325; 428/688

(58) Field of Classification Search .............. 428/32.21, 428/32.28, 32.34, 195.1, 207, 325, 688
See application file for complete search history.

(56) References Cited

U.S. PATENT DOCUMENTS

| | | | | |
|---|---|---|---|---|
| 2003/0039810 | A1 * | 2/2003 | Schulz et al. | 428/195 |
| 2010/0047455 | A1 * | 2/2010 | Hoogmartens | 427/258 |
| 2010/0189931 | A1 * | 7/2010 | van der Zwan et al. | 428/32.34 |

FOREIGN PATENT DOCUMENTS

| | | |
|---|---|---|
| DE | 19916546 | 10/2000 |
| EP | 0631880 | 1/1995 |
| EP | 0947348 | 10/1999 |
| EP | 1044822 | 10/2000 |

OTHER PUBLICATIONS

International Search Report dated Oct. 20, 2008 from PCT/EP2008/057869.

* cited by examiner

*Primary Examiner* — Betelhem Shewareged
(74) *Attorney, Agent, or Firm* — Honigman Miller Schwartz and Cohn LLP; Thomas A. Wootton; Jonathan P. O'Brien

(57) ABSTRACT

Decorative paper for decorative coating materials comprising a base paper and an ink receiving layer dyed in such a way that the decorative paper has after impregnation with impregnating resins and pressing as laminate the same coloring as the coloring of a laminate of a decorative paper that does not comprise an ink receiving layer.

10 Claims, No Drawings

INK-JET-PRINTABLE DECORATIVE PAPER

This application is the U.S. National phase of PCT Application No. PCT/EP2008/057869 filed, Jun. 20, 2008, which claims the priority of German Application No. DE 10 2007 029 540.7, filed Jun. 25, 2007. Both of these documents are incorporated herein in their entirety.

The invention relates to decorative paper that can be impregnated with thermosetting resins and printed by ink-jet methods, the decorative paper having as laminate the same color as in its untreated form.

Decorative papers are needed for producing decorative laminates used as building materials in furniture making and in interior finishing. The decorative laminates are mainly so-called high-pressure laminates (HPL) and low-pressure laminates (LPL). For the production of a high-pressure laminate, the decorative paper is impregnated with a resin in the unprinted or printed state, and pressed with one or more plies of kraft paper sheets saturated with phenolic resin (resin-laminated core papers) in a laminating press at a temperature of about 110 to 170° C. and a pressure of about 5.5 to 11 MPa. Subsequently, the laminate (HPL) thus produced is glued or bonded to a supporting material such as HDF or particle board. A low-pressure laminate is produced by pressing the unprinted or printed decorative paper, which is impregnated with a resin, at a temperature of 160 to 200° C. and a pressure of 1.25 to 3.5 MPa directly onto the support board.

The finishing of material surfaces can be of visual nature (through appropriate coloring) and/or physical nature (through coating of the board surface with appropriate functionality and structure). Decorative papers can be processed with or without imprinted pattern.

The printed pattern is usually applied by gravure printing. In the generation of customary printed patterns in particular, this printing technology has the advantage of printing large quantities of paper with high machine speed. If the patterns are printed on white decorative papers, ink consumption is high, and with more complicated patterns inadequate image definition often results due to missing dots.

Conventional decorative patterns produced by gravure printing are therefore usually printed on color-matched decorative base paper. For example, an oak imitation is printed on brown or light brown paper. This approach has two advantages. On the one hand the printed image is more natural due to more homogeneity and balanced coloring, on the other had the consumption of printing inks is reduced.

Commensurate with the demand of the last few years, the patterns to be applied have become more complicated and individual. However, this increase in the variety of the patterns is associated with a decrease of the quantities to be produced. Consequently, gravure printing is judged to be not cost-effective for low volume production, and the print quality with complicated designs has to be considered inadequate. However, the production of small quantities is of importance particularly in the area of design creation.

Of all printing technologies that meet the requirements regarding flexibility and quality, ink-jet printing becomes more and more important.

To make decorative base papers ink-jet printable, they are coated with one or more functional layers for receiving the inks and fixation of the dyes. Such an ink-jet printable decorative paper is described for example in German Patent DE 199 16 546 A1.

Ink-jet papers are usually white. The ink-jet printing inks have in part to be applied in large quantities to cover the white of the base paper in places where the pattern requires it.

It is the object of the invention to provide decorative paper that has the same advantages as colored decorative paper in gravure printing but at the same time can be produced cost-effectively in small quantities.

It is a further object of the invention to propose a decorative paper that can be used in the proofing area for fast visual evaluation of a later gravure result.

The object is solved by decorative paper comprising a base paper (decorative base paper) and an ink receiving layer, the ink receiving layer being colored in such a way that the decorative paper has after impregnation with customary impregnating resins and pressing as laminate the same coloring as a laminate of a decorative paper that does not comprise an ink receiving layer.

Base papers that can be used according to the invention are those papers that have experienced neither internal sizing nor surface sizing. They essentially consist of pulp, pigments, and fillers and customary additives. Customary additives can be wet-strength agents, retention agents and fixing agents. Decorative base papers differ from common papers by the much higher filler content or pigment content, and the lack of internal sizing or surface sizing customary with paper.

For the production of the decorative base papers, softwood pulp, hardwood pulp or mixtures of the two pulp types can be used. The use of 100% of hardwood pulp is preferred. However, mixtures of softwood/hardwood pulp in a mass ratio of 5:95 to 50:50, in particular 10:90 to 30:70, can also be used. The base papers can be produced on a Fourdrinier paper-making machine or a Yankee paper machine. For this, the pulp mixture can be beaten to a freeness of 10 to 45° SR with a stock consistency of 2 to 5% by weight. In a mixing vat, fillers and/or pigments, color pigments and/or dyes, and wet-strength agents such as polyamide/polyamine-epichlorohydrin resin, cationic polyacrylates, modified melamine-formaldehyde resin, or cationized starches can be added in quantities customary in the production of decorative papers and thoroughly mixed with the pulp mixture.

The fillers and/or pigments can be added in a quantity (mass) of up to 55% by weight, in particular 10 to 45% by weight, based on the weight of the pulp. Suitable pigments and fillers are for example titanium dioxide, talcum, zinc sulfide, kaolin, aluminum oxide, calcium carbonate, corundum, aluminum and magnesium silicates, or mixtures thereof.

The thick stock (high consistency) produced in the mixing vat can be diluted up to a pulp density (stock consistency) of about 1%. If required, further aids such as retention aids, defoaming agents, dyes and other aids mentioned above, or mixtures thereof can be added. This thin stock (low consistency) is led via the head box of the paper-making machine onto the wire section. A fiber mat is formed, and after drainage the base paper is obtained, which is subsequently dried. The grammages of the produced papers can be 15 to 300 g/m$^2$.

Depending on the application and the quality requirements, the decorative base papers used according to the invention can be of the following nature:

- smooth, i.e. having a Bekk smoothness of more than 80 s;
- non-smoothed having a Bekk smoothness of less than 80 s;
- smoothed with a Yankee cylinder or with a calendar;
- not pre-impregnated or pre-impregnated with a synthetic resin;
- very air-permeable (Gurley values of less than 20 s/hml) (hml=100 ml) or impermeable (Gurley values of more than 20 s/hml) or in case of pre-impregnated papers even extremely impermeable with Gurley values of more than 200 s/hml.

To dye the decorative papers according to the invention, inorganic color pigments such as metal oxides, metal hydroxides and metal oxide hydrates, metal sulfides, metal sulfates, metal chromates and metal molybdates, or mixtures thereof, and organic color pigments and/or dyes such as carbonyl colorants (e.g. quinones, quinacridones), cyanine colorants, azo colorants, azomethines and methines, phthalocyanines or dioxazines can be used. Mixtures of inorganic color pigments and organic color pigments or dyes are particularly preferred. For example, the following, commercially available color pigments and dyes such as Iron Oxide (IO) Yellow (Bayferrox 415), Iron Oxide (IO) Red (Bayferrox 110 M), carbon black Carbofin LC 2900, color pigments Blue PB 15, color pigments Violet PV 23, and dye Yellow PY 97, and mixtures thereof can be used. For the purpose of the invention, the color pigments and dyes mentioned above can be used both on the decorative base paper and in the ink receiving layer.

The term color pigment(s) or dye(s) means a single color pigment or a color pigment mixture or a single dye or a dye mixture.

Which color pigment(s) or dye(s) are used depends on the desired color of the decorative paper.

The quantity of color pigment(s) and/or dye(s) in the decorative base paper can be, depending on the type of substance, from 0.0001 to 5% by weight, in particular 0.001 to 4% by weight. The amount in percent by weight is based on the mass of the pulp.

All known receiving layers can be used for the ink receiving layer. They are mostly hydrophilic coatings comprising water-soluble or water-dispersible polymers.

The ink receiving layer can additionally comprise fillers, pigments, dye-fixing substances, and further aids typically used in such layers.

In a preferred embodiment of the invention, the ink receiving layer comprises a pigment and a binder in a quantity ratio of 20:80 to 80:20 (mass). The pigment quantity in the ink receiving layer is preferably 5 to 80% by weight, more preferably however 10 to 60% by weight, based on the dry weight of the layer.

The pigment can be any pigment typically used in ink-jet recording materials, in particular however aluminum oxide, aluminum hydroxide, boehmite and silica (e.g. precipitated silica or pyrogenically produced silica).

The binder can be a water-soluble and/or water-dispersible polymer, for example polyvinyl alcohol, polyvinylpyrrolidone, polyvinyl acetate, starch, gelatin, carboxymethyl cellulose, ethylene/vinyl acetate, styrene/acrylic ester copolymers, or mixtures thereof.

In a special embodiment of the invention, the ink receiving layer is dyed with the same color pigments(s) and/or dye(s) with which the base paper is dyed.

The quantity (concentration) of color pigment(s) and/or dye(s) in the ink receiving layer, based on the mass of the dried ink receiving layer, is preferably about 45 to 75%, in particular 45 to 65% of the quantity of the color pigment(s) and/or dye(s) in the base paper, based on the mass of the pulp (abs. dry).

The coating weight of the ink receiving layer can be 2 to 25 g/m$^2$, more preferably 3 to 20 g/m$^2$, most preferably 4 to 15 g/m$^2$. The ink receiving layer can be applied by the customary application methods such as roll coating, slot die coating, gravure coating or nip method, curtain coating, air knife coating or coating using a metering bar.

Suitable impregnating resins are the impregnating resins typically used in this technical field such as in particular melamine-formaldehyde resin, urea-formaldehyde resin, phenol-formaldehyde resin, polyacrylates, acrylic ester-styrene copolymers and polyvinyl alcohol. The resin quantity is 50 to 300%, preferably 95 to 150%, based on the grammage of the decorative base paper.

It has become apparent that by the approach according to the invention, not only color differences between pressing untreated decorative paper (without ink receiving layer) and pressing coated decorative paper can be avoided, but the quantity of fillers and pigments in the base paper can also be reduced. The opacity of the decorative paper produced thereof and provided with the ink receiving layer is in the pressed state the same as the opacity of the corresponding untreated decorative base paper.

The invention will now be further explained using the following examples.

EXAMPLES

Example 1

A pulp suspension was prepared by beating a pulp mixture of 80% by weight of eucalyptus pulp and 20% by weight of pine sulfate pulp to a freeness of 33° SR with a stock consistency of 5% with addition of a color pigment/dye mixture (Color Mix 1). Subsequently, 1.8% by weight of epichlorohydrin resin as wet-strength agent was added. This pulp suspension was adjusted to pH 6.5 to 7 with aluminum sulfate. Afterwards, a mixture of 40% by weight of titanium dioxide and 5% by weight of talcum, 0.11% by weight of a retention aid and 0.03% by weight of a defoamer was added to the pulp suspension, and dyed decorative base paper having a grammage of about 80 g/m$^2$ and an ash content of about 32% by weight was produced (Reference 1). The amounts in percent by weight are based on the pulp.

In the next step, a coating color for the ink receiving layer was prepared, the coating color having the following composition:

| | |
|---|---|
| water | 80% by weight |
| boehmite | 10% by weight |
| polyvinyl alcohol | 5% by weight |
| polyvinyl acetate | 4% by weight |
| quaternary polyammonium salt | 1% by weight |

To dye the coating color, in the first preparation the same color mix as in the base paper was used. For this purpose, an approx. 5% color pigment/dye suspension was prepared and added to the coating color in different dosages. Each of the coating colors with different color intensity was applied to the decorative base paper with a coating weight of 6 g/m$^2$ (blade coating/0.2 blade), and dried.

The uncoated, dyed decorative base paper (Reference 1) was impregnated with melamine-formaldehyde resin. The grammage of the paper after impregnation was 160 g/cm$^2$. Subsequently, the impregnated paper was pressed with a support as laminate (Reference Board 1). The coated, differently dyed decorative papers were also impregnated and pressed into laminates. Pressing occurred with all decorative papers at a temperature of 140° C. and a pressure of 9 MPa.

The color space of the differently dyed laminated boards was measured using a colorimeter and compared to the color space of Reference Board 1. As customary in decorative paper production, subsequently the color recipe was adapted by way of calculation and empirically, and the coating trials were repeated. The process was terminated after the variation of the color values between reference board and laminated board of coated decorative paper, measured as color difference LE, was less than 0.50. In this manner, the optimized color pigment/dye mixture for dying the coating color (Color Mix 1 Opt. I) was determined.

Then, the decorative base paper was coated again with the ink receiving layer dyed in optimized fashion using two different coating weights (3 g/m$^2$ and 9 g/m$^2$) (Decorative Papers 1A and 1B, respectively); the concentration of the color mixture in the ink receiving layer was 59.2% of the concentration of the color mixture in the decorative base paper. The coated decorative papers were impregnated and pressed into laminated boards as above. Subsequently, the color space of the boards was measured, and the color difference ΔE was determined (Table 2).

Example 2

A pulp suspension was prepared by beating a pulp mixture of 80% by weight of eucalyptus pulp and 20% by weight of pine sulfate pulp to a freeness of 33° SR with a stock consistency of 5% with addition of a color pigment mixture (Color Mix 2). Subsequently, 1.8% by weight of epichlorohydrin resin as wet-strength agent was added. This pulp suspension was adjusted to pH 6.5 to 7 with aluminum sulfate. Afterwards, a mixture of 40% by weight of titanium dioxide and 5% by weight of talcum, 0.11% by weight of a retention aid and 0.03% by weight of a defoamer was added to the pulp suspension, and dyed decorative base paper having a grammage of about 80 g/m$^2$ and an ash content of about 32% by weight was produced from this (Reference 2). The amounts in percent by weight are based on the pulp.

In accordance with the colored decorative base paper, the color pigment/dye mixture needed for dying the ink receiving layer was determined (Color Mix 2 Opt. I). The approach for determining the required quantity of the color pigment/dye mixture in the ink receiving layer was the same as in Example 1.

Then, the decorative base paper was coated again with the ink receiving layer dyed in optimized fashion using a coating weight of 6 g/m$^2$ (Decorative Paper 2); the concentration of the color mixture in the ink receiving layer was 49.3% of the concentration of the color mixture in the decorative base paper. The uncoated decorative base paper (Reference 2) was impregnated and pressed into a laminated board (Reference Board 2) as described above. Coated Decorative Paper 2 was also processed in the same manner. Subsequently, the color space of the boards was measured, and the color difference ΔE was determined (Table 2).

Example 3

A pulp suspension of 100% by weight of eucalyptus pulp was beaten to a freeness of 33° SR with a stock consistency of 5% with addition of a color pigment mixture (Color Mix 3). Subsequently, 1.8% by weight of epichlorohydrin resin as wet-strength agent was added. This pulp suspension was adjusted to pH 6.5 to 7 with aluminum sulfate. Afterwards, a mixture of 40% by weight of titanium dioxide and 5% by weight of talcum, 0.11% by weight of a retention aid and 0.03% by weight of a defoamer was added to the pulp suspension, and dyed decorative base paper having a grammage of about 80 g/m$^2$ and an ash content of about 32% by weight was produced from this (Reference 3). The amounts in percent by weight are based on the pulp.

In accordance with the colored decorative base paper, the color pigment/dye mixture needed for dying the ink receiving layer was determined (Color Mix 3 Opt. I). The approach for determining the required quantity of the color pigment/dye mixture in the ink receiving layer was the same as in Example 1.

Then, the decorative base paper was coated again with the ink receiving layer dyed in optimized fashion using a coating weight of 6 g/m$^2$ (Decorative Paper 3); the concentration of the color mixture in the ink receiving layer was 50.7% of the concentration of the color mixture in the decorative base paper.

The uncoated decorative paper was impregnated as described above, and pressed into a laminated board (Reference Board 3) under the same conditions as in Example 1. Decorative Paper 3 was also impregnated and pressed into a laminated board. Subsequently, the color space of the laminated boards was measured, and the color difference ΔE was determined (Table 2).

Example 4

A pulp suspension of 100% by weight of eucalyptus pulp was beaten to a freeness of 33° SR with a stock consistency of 5% with addition of a color pigment/dye mixture (Color Mix 4). Subsequently, 1.8% by weight of epichlorohydrin resin as wet-strength agent was added. This pulp suspension was adjusted to pH 6.5 to 7 with aluminum sulfate. Afterwards, a mixture of 40% by weight of titanium dioxide and 5% by weight of talcum, 0.11% by weight of a retention aid and 0.03% by weight of a defoamer was added to the pulp suspension, and dyed decorative base paper having a grammage of about 80 g/m$^2$ and an ash content of about 32% by weight was produced from this (Reference 4). The amounts in percent by weight are based on the pulp.

In accordance with the colored decorative base paper, the color pigment/dye mixture needed for dying the ink receiving layer was determined (Color Mix 4 Opt. I). The approach for determining the required quantity of the mixture in the ink receiving layer was the same as in Example 1.

Then, the decorative base paper was coated again with the ink receiving layer dyed in optimized fashion using a coating weight of 18 g/m$^2$ (Decorative Paper 4); the concentration of the color mixture in the ink receiving layer was 62.6% of the concentration of the color mixture in the decorative base paper.

Reference Paper 4 was impregnated and pressed into Reference Board 4 as in Example 1. Coated Decorative Paper 4 was also impregnated and pressed into a laminated board. Subsequently, the color space of the boards was measured and the color difference LE was determined (Table 2).

Example 5

A pulp suspension was prepared by beating a pulp mixture of 80% by weight of eucalyptus pulp and 20% by weight of pine sulfate pulp to a freeness of 33° SR with a stock consistency of 5% with addition of a color pigment mixture (Color Mix 1). Subsequently, 1.8% by weight of epichlorohydrin resin as wet-strength agent was added. This pulp suspension was adjusted to pH 6.5 to 7 with aluminum sulfate. Afterwards, a mixture of 36% by weight of titanium dioxide and 5% by weight of talcum, 0.11% by weight of a retention aid and 0.03% by weight of a defoamer was added to the pulp suspension, and dyed decorative base paper having a grammage of about 80 g/m$^2$ and an ash content of about 30% by weight was produced from this (Reference 5). The amounts in percent by weight are based on the pulp.

Then, the decorative base paper was coated with the ink receiving layer dyed with Color Mix 1 Opt. I according to Example 1. The coating weight was 6 g/m$^2$ (Decorative Paper 5).

Reference Paper 5 was impregnated and pressed into Reference Board 5 as in Example 1. Coated Decorative Paper 5 was also impregnated and pressed into a laminated board. Subsequently, the color space of the laminated boards was measured, and the color difference ΔE was determined (Table 2).

Example 6

A pulp suspension of 100% by weight of eucalyptus pulp was beaten to a freeness of 33° SR with a stock consistency of 5% with addition of a color pigment mixture (Color Mix 3). Subsequently, 1.8% by weight of epichlorohydrin resin as wet-strength agent was added. This pulp suspension was adjusted to pH 6.5 to 7 with aluminum sulfate. Afterwards, a mixture of 36% by weight of titanium dioxide and 5% by weight of talcum, 0.11% by weight of a retention aid and 0.03% by weight of a defoamer was added to the pulp suspension, and dyed decorative base paper having a grammage of about 80 g/m$^2$ and an ash content of about 30% by weight was produced from this (Reference 6). The amounts in percent by weight are based on the pulp.

Then, the decorative base paper was coated with the ink receiving layer dyed with Color Mix 3 Opt. I according to Example 3. The coating weight was 6 g/m$^2$ (Decorative Paper 6).

Reference Paper 6 was impregnated and pressed into Reference Board 6 as in Example 1. Coated Decorative Paper 6 was also impregnated and pressed into a laminated board. Subsequently, the color space of the boards was measured and the color difference ΔE was determined (Table 2).

Comparative Example C1

The decorative base paper from Example 1 (Reference 1) was coated with the ink receiving layer described in Example 1 with a coating weight of 3 g/m$^2$ but without any dyes and/or color pigments (Decorative Paper C1). The coated decorative paper was impregnated and pressed into a laminate as in the other examples. Subsequently, the color space of the board was measured and compared to the color space of Reference Board 1. The color difference ΔE was determined (Table 2).

Comparative Example C2

The decorative base paper from Example 1 (Reference 1) was coated with an ink receiving layer comprising a mixture of color pigments/dyes as used in Decorative Paper 1B but in a concentration of 37.7% (Color Mix 1 Opt. II) of the quantity of the corresponding mixture in the base paper (Table 1). The coating weight of the ink receiving layer was 9 g/m$^2$. Further processing of the decorative paper (impregnating and pressing into a laminated board) occurred as in the other examples. Subsequently, the color space of the board was measured and compared to the color space of Reference Board 1. The determined color difference LE is given in Table 2.

Comparative Example C3

The decorative base paper from Example 3 (Reference 3) was coated with an ink receiving layer comprising a mixture of color pigments/dyes as used in Decorative Paper 3 but in a concentration of 80.7% (Color Mix 3 Opt. II) of the quantity of the corresponding mixture in the base paper (Table 1). The coating weight of the ink receiving layer was 6 g/m$^2$. Further processing of the decorative paper (impregnating and pressing into a laminated board) occurred as in the other examples. Subsequently, the color space of the board was measured and compared to the color space of Reference Board 3. The determined color difference LE is given in Table 2.

In Table 1, the decorative papers dyed according to the invention and the comparative examples are listed.

Testing

Color measurements on the produced laminated boards were performed using a colorimeter Model SF 600 from Datacolor. The color difference LE between reference board and laminated board with coated decorative paper was determined. The color difference was calculated according to DIN 6174. The calculation is based on the CIE L*a*b* color space system. The L*a*b* values of sample and reference were measured, and the color difference was determined using the following equation:

$$\Delta E=\sqrt{(\Delta L^*)^2+(\Delta a^*)^2+(\Delta b^*)^2}$$

The smaller the color difference ΔE, the lesser is the difference between a decorative paper suitable for gravure printing and an ink-jet-printable decorative paper suitable for low volume production.

To evaluate opacity, the color space of the laminates from Examples 5 and 6 was measured, compared to the color space from Reference Boards 1 and 3, and the opacity difference Δopacity determined. If the coloring is the same, the difference between the laminates to be compared Δopacity is <1%.

Measurements occurred under the following measuring conditions:

test: CIELab D65 10°, DIN 5033
light source: pulsed xenon light, UV filter: 100
physical filtering D65 (approximately daylight)
spectral range 360 nm to 700 nm The results of the measurements are summarized in Tables 2 and 3.

TABLE 1

| Example | Pigment base paper Type/quantity (wt % based on pulp (abs. dry)) | | Pigment ink receiving layer (IRL) Type/quantity (wt % based on dried ink receiving layer) |
|---|---|---|---|
| Reference 1 | Color Mix 1 | | |
| Light gray | IO Yellow | 0.0610 | |
| Ash content: | Pigment Blue | 0.0033 | |
| 32% by weight | Pigment Violet | 0.0078 | |
| | Pigment Black | 0.0910 | |

TABLE 1-continued

| Example | Pigment base paper Type/quantity (wt % based on pulp (abs. dry)) | | Pigment ink receiving layer (IRL) Type/quantity (wt % based on dried ink receiving layer) | |
|---|---|---|---|---|
| Decorative Paper 1A | Color Mix 1 | | Color Mix 1 Opt. I (after optimization) | |
| Light gray | IO Yellow | 0.0610 | IO Yellow | 0.0365 |
| Coating weight: | Pigment Blue | 0.0033 | Pigment Blue | 0.0020 |
| 3 g/m$^2$ | Pigment Violet | 0.0078 | Pigment Violet | 0.0035 |
| | Pigment Black | 0.0910 | Pigment Black | 0.0545 |
| Decorative Paper 1B | Color Mix 1 | | Color Mix 1 Opt. I (after optimization) | |
| Light gray | IO Yellow | 0.0610 | IO Yellow | 0.0365 |
| Coating weight: | Pigment Blue | 0.0033 | Pigment Blue | 0.0020 |
| 9 g/m$^2$ | Pigment Violet | 0.0078 | Pigment Violet | 0.0035 |
| | Pigment Black | 0.0910 | Pigment Black | 0.0545 |
| Reference 2 | Color Mix 2 | | | |
| Gray | IO Yellow | 0.4400 | | |
| Ash content: | IO Red | 0.1040 | | |
| 32% by weight | Pigment Black | 0.2100 | | |
| Decorative Paper 2 | Color Mix 2 | | Color Mix 2 Opt. I (after optimization) | |
| Gray | IO Yellow | 0.4400 | IO Yellow | 0.1980 |
| Coating weight: | IO Red | 0.1040 | IO Red | 0.0675 |
| 6 g/m$^2$ | Pigment Black | 0.2100 | Pigment Black | 0.1065 |
| Reference 3 | Color Mix 3 | | | |
| Beige | IO Yellow | 2.1350 | | |
| Ash content: | IO Red | 0.1380 | | |
| 32% by weight | Pigment Black | 0.0110 | | |
| Decorative Paper 3 | Color Mix 3 | | Color Mix 3 Opt. I (after optimization) | |
| Beige | IO Yellow | 2.1350 | IO Yellow | 1.0675 |
| Coating weight: | IO Red | 0.1380 | IO Red | 0.0830 |
| 6 g/m$^2$ | Pigment Black | 0.0110 | Pigment Black | 0.0070 |
| Reference 4 | Color Mix 4 | | | |
| Brown | IO Yellow | 2.6000 | | |
| Ash content: | Dye Yellow | 0.3300 | | |
| 32% by weight | IO Red | 0.1100 | | |
| | Black | 0.0200 | | |
| Decorative Paper 4 | Color Mix 4 | | Color Mix 4 Opt. I (after optimization) | |
| Brown | IO Yellow | 2.6000 | IO Yellow | 1.6900 |
| Coating weight: | Dye Yellow | 0.3300 | Dye Yellow | 0.1650 |
| 18 g/m$^2$ | IO Red | 0.1100 | IO Red | 0.0495 |
| | Black | 0.0200 | Black | 0.0120 |
| Reference 5 | Color Mix 1 | | | |
| Light gray | IO Yellow | 0.0610 | | |
| Ash content: | Pigment Blue | 0.0033 | | |
| 30% by weight | Pigment Violet | 0.0078 | | |
| | Pigment Black | 0.0910 | | |
| Decorative Paper 5 | Color Mix 1 | | Color Mix 1 Opt. I (after optimization) | |
| Light gray | IO Yellow | 0.0610 | IO Yellow | 0.0365 |
| Ash content: | Pigment Blue | 0.0033 | Pigment Blue | 0.0020 |
| 30% by weight | Pigment Violet | 0.0078 | Pigment Violet | 0.0035 |
| Coating weight: | Pigment Black | 0.0910 | Pigment Black | 0.0545 |
| 6 g/m$^2$ | | | | |
| Reference 6 | Color Mix 3 | | | |
| Beige | IO Yellow | 2.1350 | | |
| Ash content: | IO Red | 0.1380 | | |
| 30% by weight | Pigment Black | 0.0110 | | |
| Decorative Paper 6 | Color Mix 3 | | Color Mix 3 Opt. I (after optimization) | |
| Beige | IO Yellow | 2.1350 | IO Yellow | 1.0675 |
| Ash content: | IO Red | 0.1380 | IO Red | 0.0830 |
| 30% by weight | Pigment Black | 0.0110 | Pigment Black | 0.0070 |
| Coating weight: | | | | |
| 6 g/m$^2$ | | | | |
| Decorative Paper C1 | Color Mix 1 | | No color pigments/dyes in | |
| Light gray | IO Yellow | 0.0610 | ink receiving layer | |
| Ash content: | Pigment Blue | 0.0033 | | |
| 32% by weight | Pigment Violet | 0.0078 | | |
| Coating weight: | Pigment Black | 0.0910 | | |
| 3 g/m$^2$ | | | | |

TABLE 1-continued

| Example | Pigment base paper Type/quantity (wt % based on pulp (abs. dry)) | | Pigment ink receiving layer (IRL) Type/quantity (wt % based on dried ink receiving layer) | |
|---|---|---|---|---|
| Decorative Paper C2 | Color Mix 1 | | Color Mix 1 Opt. II | |
| Light gray | IO Yellow | 0.0610 | IO Yellow | 0.0245 |
| Ash content: | Pigment Blue | 0.0033 | Pigment Blue | 0.0015 |
| 32% by weight | Pigment Violet | 0.0078 | Pigment Violet | 0.0030 |
| Coating weight: | Pigment Black | 0.0910 | Pigment Black | 0.0325 |
| 6 g/m$^2$ | | | | |
| Decorative Paper C3 | Color Mix 3 | | Color Mix 3 Opt. II | |
| Beige | IO Yellow | 2.1350 | IO Yellow | 1.7080 |
| Ash content: | IO Red | 0.1380 | IO Red | 0.1240 |
| 32% by weight | Pigment Black | 0.0110 | Pigment Black | 0.0105 |
| Coating weight: | | | | |
| 6 g/m$^2$ | | | | |

Iron Oxide (IO) Yellow: Bayferrox 415, Lanxess
Iron Oxide (IO) Red: Bayferrox 110 M, Lanxess
Color Pigment Black: Carbon Black Carbofin LC 2900
Color Pigment Blue: C.I. Pigment Blue 15
Color Pigment Violet: C.I. Pigment Violet 23
Dye Yellow: C.I. Pigment Yellow 97
C.I. = Color Index

TABLE 2

Color Testing Results

| Examples | Color difference ΔE |
|---|---|
| Example 1A | 0.20 |
| Example 1B | 0.43 |
| Example 2 | 0.29 |
| Example 3 | 0.37 |
| Example 4 | 0.42 |
| Example 5 | 0.35 |
| Example 6 | 0.38 |
| Comparative Example C1 | 1.51 |
| Comparative Example C2 | 0.85 |
| Comparative Example C3 | >2 |

TABLE 3

Opacity Assessment

| Comparison | | ΔOpacity |
|---|---|---|
| Decorative Paper 5 | Reference 1 | <1% |
| Decorative Paper 6 | Reference 3 | <1% |

As can be seen from Table 2, all decorative papers produced according to the invention have a small color difference. The reduction of titanium dioxide does not result in a worsening of the opacity (Table 3).

The invention claimed is:

1. Decorative paper for decorative coating materials comprising a base paper and an ink receiving layer, wherein the ink receiving layer is dyed in such a way that the decorative paper has after impregnation with impregnating resins and pressing as laminate the same coloring as the coloring of a laminate of a decorative paper that does not comprise an ink receiving layer, the ink receiving layer comprising color pigment(s) and/or dye(s) in a quantity, based on the mass of the dried ink receiving layer, of 45 to 75% of the quantity of color pigment(s) and/or dye(s) in the decorative base paper, based on the mass of the pulp (abs. dry).

2. The decorative paper according to claim 1, wherein the base paper and the ink receiving layer are dyed with identical color pigment(s) and/or dye(s).

3. The decorative paper according to claim 1, wherein the ink receiving layer comprises at least one inorganic color pigment from the group of metal oxides and/or at least one organic color pigment.

4. The decorative paper according to claim 1, wherein the ink receiving layer comprises a pigment and a binder in a quantity ratio of 20:80 to 80:20.

5. The decorative paper according to claim 4, wherein the pigment can be aluminum oxide, aluminum hydroxide, boehmite and/or silica.

6. The decorative paper according to claim 3, wherein the ink receiving layer comprises a pigment and a binder in a quantity ratio of 20:80 to 80:20.

7. The decorative paper according to claim 6, wherein the pigment can be aluminum oxide, aluminum hydroxide, boehmite and/or silica.

8. The decorative paper according to claim 2, wherein the ink receiving layer comprises at least one inorganic color pigment from the group of metal oxides and/or at least one organic color pigment.

9. The decorative paper according to claim 8, wherein the ink receiving layer comprises a pigment and a binder in a quantity ratio of 20:80 to 80:20.

10. The decorative paper according to claim 9, wherein the pigment can be aluminum oxide, aluminum hydroxide, boehmite and/or silica.

* * * * *